US012714136B2

(12) United States Patent
Batista et al.

(10) Patent No.: US 12,714,136 B2
(45) Date of Patent: Aug. 25, 2026

(54) ROD-SHAPED AEROSOL GENERATING ARTICLE WITH ELECTROMAGNETIC INFORMATION MARKER

(71) Applicant: Philip Morris Products S.A., Neuchatel (CH)

(72) Inventors: Rui Nuno Batista, Morges (CH); Ricardo Cali, Mannheim (DE); Andreas Loeb, Ludwigshafen am Rhein (DE); Jeroen Diepstraten, St-Sulpice (CH); Joanna Lawniczek-Vulliens, Boulens (CH); Meruyert Tav, Almaty (KZ); Michele Pisetta, Lausanne (CH); Mirela Spagovic, Lausanne (CH); Nitin Manoharan, St-Sulpice (CH); Paolo Lenti, Ecublens (CH); Tobias Oplustil, St-Saphorin (CH); Valdas Venckunas, Epalinges (CH); Bruno Chamielec, Chez-le-Bart (CH)

(73) Assignee: Philip Morris Products S.A., Neuchatel (CH)

( * ) Notice: Subject to any disclaimer, the term of this patent is extended or adjusted under 35 U.S.C. 154(b) by 631 days.

(21) Appl. No.: 17/997,308

(22) PCT Filed: Apr. 28, 2021

(86) PCT No.: PCT/EP2021/061150

§ 371 (c)(1),
(2) Date: Oct. 27, 2022

(87) PCT Pub. No.: WO2021/219730

PCT Pub. Date: Nov. 4, 2021

(65) Prior Publication Data

US 2023/0165301 A1 Jun. 1, 2023

(30) Foreign Application Priority Data

Apr. 29, 2020 (EP) .................................... 20172102

(51) Int. Cl.
*A24D 1/02* (2006.01)
*A24C 5/00* (2020.01)
(Continued)

(52) U.S. Cl.
CPC ................ *A24D 1/02* (2013.01); *A24C 5/005* (2013.01); *A24C 5/01* (2020.01); *A24D 1/20* (2020.01);
(Continued)

(58) Field of Classification Search
CPC ........................................................ A24D 1/02
See application file for complete search history.

(56) References Cited

U.S. PATENT DOCUMENTS 4,583,558 A 4/1986 Luke
4,652,479 A * 3/1987 Suzuki .................. G11B 5/718
(Continued)

FOREIGN PATENT DOCUMENTS

CN 110720667 A 1/2020
EP 1 307 865 A0 5/2003
(Continued)

OTHER PUBLICATIONS

English Machine Translation of WO 2020001446 A1, obtained from PE2E Search (Clarivate Analytics) (Year: 2020).*
(Continued)

*Primary Examiner* — Philip Y Louie
*Assistant Examiner* — Charlotte Davison
(74) *Attorney, Agent, or Firm* — Oblon, McClelland, Maier & Neustadt, L.L.P.

(57) ABSTRACT

A method for manufacturing a rod-shaped aerosol-generating article is provided, including: arranging segments in a
(Continued)

row along a longitudinal direction; wrapping a first sheet around at least one of the segments; and wrapping a second sheet around at least one of the segments so as to at least partially overlap the first sheet, such that upon wrapping the second sheet, an electromagnetic information marker is created, the electromagnetic information marker including a first structure provided on the first sheet and a second structure provided on the second sheet. A rod-shaped aerosol-generating article, an aerosol-generating system, and a sheet, are also provided.

18 Claims, 2 Drawing Sheets

(51) Int. Cl.

| | |
|---|---|
| ***A24C 5/01*** | (2020.01) |
| ***A24D 1/00*** | (2020.01) |
| ***A24D 1/20*** | (2020.01) |
| ***A24F 40/20*** | (2020.01) |
| ***A24F 40/53*** | (2020.01) |
| ***A24F 40/60*** | (2020.01) |
| ***G06K 7/10*** | (2006.01) |

(52) U.S. Cl.
CPC .............. *A24F 40/20* (2020.01); *A24F 40/53* (2020.01); *G06K 7/10366* (2013.01)

(56) References Cited

U.S. PATENT DOCUMENTS

| | | | | |
|---|---|---|---|---|
| 5,902,501 | A * | 5/1999 | Nunnally | A24F 40/40 219/269 |
| 12,053,015 | B2 | 8/2024 | Chen | |
| 2002/0012815 | A1 * | 1/2002 | Veitch | G11B 5/70678 |
| 2004/0149602 | A1 | 8/2004 | Draghetti et al. | |
| 2004/0200492 | A1 | 10/2004 | Brooks | |
| 2008/0029111 | A1 | 2/2008 | Dube et al. | |
| 2019/0216127 | A1 | 7/2019 | Richmond et al. | |
| 2021/0112582 | A1 | 4/2021 | Chen | |

FOREIGN PATENT DOCUMENTS

| | | | | |
|---|---|---|---|---|
| EP | 1 422 168 | A1 | 5/2004 | |
| JP | 59-183682 | A | 10/1984 | |
| JP | 2001-357512 | A | 12/2001 | |
| JP | 2004-196423 | A | 7/2004 | |
| JP | 2009-545324 | A | 12/2009 | |
| KR | 10-2002759 | B1 | 7/2019 | |
| KZ | 33794 | B | 7/2019 | |
| RU | 2 517 125 | C2 | 5/2014 | |
| RU | 2 670 042 | C1 | 10/2018 | |
| WO | WO 2004/089199 | A1 | 10/2004 | |
| WO | WO 2008/019281 | A2 | 2/2008 | |
| WO | WO 2019/143740 | A1 | 7/2019 | |
| WO | WO-2020001446 | A1 * | 1/2020 | A24D 1/02 |
| WO | WO 2021/123321 | A1 | 6/2021 | |

OTHER PUBLICATIONS

English Machine Translation of WO 2020001446, obtained from PE2E Search (Clarivate Analytics) (Year: 2020).*

Combined Russian Decision to Grant and Search Report issued Sep. 2, 2024 in Russian Patent Application No. 2022130876/03 (with English Translation of Category of Cited Documents), 12 pages.

Combined Chinese Office Action and Search Report issued Oct. 23, 2024 in Chinese Patent Application No. 202180031232.1 (with unedited computer-generated English Translation), 35 pages.

Japanese Office Action issued Mar. 3, 2025 in Japanese Patent Application No. 2022-563044 (with unedited computer-generated English Translation), 7 pages.

Japanese Office Action issued Sep. 1, 2025 in Japanese Patent Application No. 2022-563044, 3 pages.

International Search Report and Written Opinion mailed on Oct. 22, 2021 in PCT/EP2021/061150 filed on Apr. 28, 2021 (citing references 1-5 & 17 therein, 15 pages).

International Preliminary Report on Patentability mailed on Oct. 14, 2022 in PCT/EP2021/061150 filed on Apr. 28, 2021 (citing references 1-3, 6, & 18 therein, 16 pages).

Written Opinion issued by the International Preliminary Examining Authority mailed on Jul. 26, 2022 in PCT/EP2021/061150 filed on Apr. 28, 2021 (citing references 1-3, 6,18, & 19 therein, 8 pages).

Office Action dated Jul. 9, 2026, issued in corresponding Japanese patent application No. 2025-092471 (citing document 1).

* cited by examiner 48
33
31
37
50
35
41
43
39
45
1

48
33
31
37
50
35
41
43
39,45
1

51
49
53
49
1

ROD-SHAPED AEROSOL GENERATING ARTICLE WITH ELECTROMAGNETIC INFORMATION MARKER

The present disclosure relates to rod-shaped aerosol generating articles.

EP 1 422 168 A1 describes a package of tobacco articles, comprising a container, a group of tobacco articles housed inside the container, and at least one shoplifting marker housed inside the container. The shoplifting marker comprises magnetic resonating means resonating at a given resonance frequency. The shoplifting marker is remotely detectable by a shoplifting detector device by means of a magnetic field having a frequency substantially equal to the resonance frequency. The shoplifting marker comprises a supporting element provided with segments of magnetic material. The shoplifting marker may be glued to different surfaces of the container. Alternatively, the shoplifting marker may be incorporated in at least one cigarette in a group of tobacco articles. Specifically, the shoplifting marker may be housed inside a filter of a cigarette or may be wound about a filter of a cigarette, or may be supported by a connecting strip, or may be housed inside a rod of tobacco of a cigarette.

According to an aspect of the present invention, there is provided a method for manufacturing a rod-shaped aerosol generating article. The method comprises arranging segments in a row along a longitudinal direction. The method further comprises wrapping a first sheet around at least one of the segments. The method further comprises wrapping a second sheet around at least one of the segments so as to at least partially overlap the first sheet. Upon wrapping the second sheet, an electromagnetic information marker is created. The electromagnetic information marker comprises a first structure provided on the first sheet and a second structure provided on the second sheet.

As the electromagnetic information marker is created upon wrapping the second sheet around at least one of the segments, creation of the electromagnetic information marker can be easily integrated in the existing manufacturing process of the aerosol generating article. This way, advantageously, no additional means for attaching the electromagnetic information marker to the aerosol generating article are required. At least one of the first sheet and the second sheet may serve as substrate for the first structure or the second structure in addition to having another function in the aerosol generating article, such as covering one or more of the segments or combining two or more of the segments.

At least one of the segments around which the second sheet is wrapped may be a segment around which the first sheet has been wrapped. The overlap between the first sheet and the second sheet may at least partially surround one of the segments. The segments around which the second sheet is wrapped may be distinct from the segments around which the first sheet is wrapped. The overlap between the first sheet and the second sheet may surround a spacing between segments.

Upon wrapping the second sheet, the second structure may be positioned to at least partially overlap the first structure. Overlap between the first structure and the second structure facilitates interaction between the first structure and the second structure.

At least one of the steps of wrapping the first sheet and wrapping the second sheet may connect two or more of the segments with each other. At least one of wrapping the first sheet and wrapping the second sheet may connect three or more segments, or four or more segments, or six or more segments with each other. At least one of wrapping the first sheet and wrapping the second sheet may connect less than 20 segments, less than 15 segments, less than ten segments, less than eight segments, or less than four segments with each other.

On a continuous rod maker, like a tobacco rod maker or a filter rod maker, at least one of the steps of wrapping the first sheet and wrapping the second sheet may connect an almost indefinite amount of segments (until the production of the continuous rod is interrupted), such that the upper limit of at least temporally connected segments could be in the millions. A plurality of first structures may be arranged at intervals on the first sheet and a plurality of second structures may be arranged at corresponding intervals on the second sheet. Upon wrapping the first sheet and the second sheet, a plurality of electromagnetic information markers may be created, each comprising a first structure and a second structure. At a later stage, the continuous rod may be separated to form individual articles. Preferably, each of the individual articles comprises one or more of the electromagnetic information markers.

Combining segments of the aerosol generating article and creating the electromagnetic information marker may be achieved in a single process step.

Wrapping the second sheet may be carried out after wrapping the first sheet. The step of wrapping the second sheet around at least one of the segments may be carried out after the first sheet has been completely wrapped around at least one segment.

The step of wrapping the second sheet around at least one of the segments may be carried out after the step of arranging the segments in a row along the longitudinal direction. The step of wrapping the first sheet around at least one of the segments may be carried out after the step of arranging the segments in a row along the longitudinal direction. Alternatively, the step of wrapping the first sheet around at least one of the segments may be carried out before the step of arranging the segments in a row the longitudinal direction.

The first structure or the second structure may comprise or be formed of a first metallic material. The other one of the first structure and the second structure may comprise or be formed of a second metallic material. The first metallic material may comprise metallic components. The first metallic material may comprise a metallic ink or a metallic paste. The second metallic material may comprise metallic components. The second metallic material may comprise a metallic ink or a metallic paste. The first metallic material or the second metallic material or both may comprise a metal based alloy. The metal based alloy may comprise manganese. The metal based alloy may comprise manganese at 7 to 20 weight percent, or at 9 to 18 weight percent, or at 11 to 15 weight percent. The metal based alloy may comprise at least one ferromagnetic material. The metal based alloy may comprise at least one ferromagnetic material at less than 10 weight percent, or at less than 8 weight percent. The metal based alloy may comprise iron (Fe). The metal based alloy may comprise or be based on one or more of cobalt (Co), chromium (Cr), nickel (Ni), titanium (Ti), and aluminum (Al).

The first magnetic material may have a different magnetic coercivity than the second magnetic material. The first magnetic material may have a higher magnetic coercivity than the second magnetic material. The magnetic coercivity of a material is the ability of a material to withstand an external magnetic field without becoming de-magnetized. The magnetic coercivity of the second metallic material may lie in a range from 10 to 90 Oersted (Oe), or in a range from 15 to 70 Oersted (Oe). The magnetic coercivity may be measured using a direct current method at about 50 to 60 Kilohertz (kHz), for example.

The electromagnetic information marker may be configured to be read out by exposing the electromagnetic information marker to an alternating magnetic field.

The method may further comprise reading out the electromagnetic information marker. Reading out the electromagnetic information marker may allow obtaining information stored on the electromagnetic information marker.

Reading out the electromagnetic information marker may comprise exposing the electromagnetic information marker to an alternating magnetic field. The alternating magnetic field may have a frequency in a range of 10 Hertz (Hz) to 20 Kilohertz (kHz). If the electromagnetic information marker is subjected to an alternating electromagnetic field, the information marker may emit a response signal.

Exposing the electromagnetic information marker to the alternating magnetic field may comprise carrying out a frequency sweep with the alternating magnetic field. The frequency of the alternating magnetic field may be swept through a range between 10 Hertz (Hz) and 20 Kilohertz (kHz), or a subrange of the range between 10 Hertz (Hz) and 20 Kilohertz (kHz). For example, if a frequency sweep is carried out, one or more resonance frequencies of the electromagnetic information marker may be determined.

Reading out the electromagnetic information marker may comprise detecting a response of the electromagnetic information marker to the alternating magnetic field. The response of the electromagnetic information marker may be in the form of an electromagnetic field. The response of the electromagnetic information marker may be at a resonance frequency of the electromagnetic information marker.

Detecting the response of the electromagnetic information marker to the alternating magnetic field may comprise determining presence or absence of a response of the electromagnetic information marker to the alternating magnetic field. By determining whether the electromagnetic information marker emits a response to the alternating electromagnetic field, or does not emit a response to the alternating electromagnetic field, binary-type information can be obtained.

Detecting the response of the electromagnetic information marker to the alternating magnetic field may comprise determining at least one frequency of the response of the electromagnetic information marker to the alternating magnetic field. The frequency of the response of the electromagnetic information marker may correspond to a resonance frequency of the electromagnetic information marker. The electromagnetic information marker may have one or more resonance frequencies. A frequency of the response of the electromagnetic information marker to the alternating magnetic field may codify information stored on the information marker.

The first structure may comprise first sub-structures. The second structure may comprise second sub-structures. Each first sub-structure may, together with a corresponding second sub-structure, form a sub-marker configured to be read out by magnetic interaction with the sub-marker. The sub-structures may be, for example, dot-shaped or rectangle-shaped or stripe-shaped. One or more first sub-structures may differ from one or more other first sub-structures in size or shape or in size and shape. One or more second sub-structures may differ from one or more other second sub-structures in size or shape or in size and shape.

Each sub-marker of the electromagnetic information marker may have at least one resonance frequency. The resonance frequencies of one or more sub-markers may be different from the resonance frequencies of one or more other sub-markers. Reading out the electromagnetic information marker may comprise individually reading out each of the sub-markers of the electromagnetic information marker. By increasing the number of sub-markers, the information storage capacity of the electromagnetic information marker may be increased.

The method may further comprise writing information on the electromagnetic information marker. The step of writing information on the electromagnetic information marker may be carried out after wrapping the second sheet. Writing information on the electromagnetic information marker may be carried out during manufacturing of the aerosol generating article or after manufacturing of the aerosol generating article is completed.

Writing the information on the electromagnetic information marker may comprise subjecting the electromagnetic information marker to a direct current (DC) magnetic field. A DC magnetic field is a magnetic field having a frequency of zero Hertz (Hz).

The method may further comprise printing the first structure onto the first sheet, or evaporating the first structure onto the first sheet, or laminating the first structure onto the first sheet.

The method may further comprise printing the second structure onto the second sheet, or evaporating the second structure onto the second sheet, or laminating the second structure onto the second sheet.

The method for manufacturing the rod-shaped aerosol generating article may be carried out multiple times to produce a plurality of rod-shaped aerosol generating articles. The positioning of the second structure relative to the first structure may be different for at least some of the produced aerosol generating articles. By changing the positioning of the second structure relative to the first structure, a resonance frequency of the electromagnetic information marker may be changed. How the second structure is positioned with respect to the first structure may be changed from time to time during manufacturing a plurality of rod-shaped aerosol generating articles. Based on the relative positioning of the second structure relative to the first structure, an individual aerosol generating article may be attributed to a particular lot of aerosol generating articles.

According to another aspect of the present invention, there is provided a rod-shaped aerosol generating article. The rod-shaped aerosol generating article comprises an electromagnetic information marker. The electromagnetic information marker stores information having an information content exceeding one bit.

The information stored by the electromagnetic information marker has a higher information content than information obtained from a device solely based on whether the device is in an activated state or in a deactivated state, such as an activated state or a deactivated state of a shoplifting marker. The electromagnetic information marker of the aerosol generating article allows storing information having a certain complexity. As the electromagnetic information marker is part of the aerosol generating article, the information stored on the electromagnetic information marker is available from the individual aerosol generating article. The information stored by the electromagnetic information marker may comprise information about the individual aerosol generating article.

The aerosol generating article may be disposable. The aerosol generating article may comprise tobacco material. A length of the aerosol generating article along its longitudinal direction may be between 1 centimeter (cm) and 20 centimeters (cm), or between 2 centimeters (cm) and 15 centimeters (cm), or between 4 centimeters (cm) and 12 centimeters (cm).

The electromagnetic information marker may store information on one or more of a manufacturing location of the aerosol generating article, a manufacturing date of the aerosol generating article, a manufacturing time of the aerosol generating article, a type of the aerosol generating article, and verification information. The information on the manufacturing location may, for example, comprise information on a country or information on a specific factory. The information on the manufacturing date may comprise one or more of information on a year, information on a month, and information on a day of manufacturing. The information on the type of the aerosol generating article may comprise, for example, a code corresponding to a type of the aerosol generating article, such as an article number. The verification information may enable verification of authenticity of the aerosol generating article. Information on the electromagnetic information marker may be correlated or compared with other information. The other information may, for example, be provided on a packaging of the aerosol generating article.

The electromagnetic information marker may comprise a first structure and a second structure. The second structure may at least partially overlap the first structure.

The first structure or the second structure may comprise a first metallic material. The other one of the first structure and the second structure may comprise a second metallic material. The first metallic material may have a higher magnetic coercivity than the second metallic material.

The first structure or the second structure may exhibit magnetostriction. Magnetostriction is a property of magnetic materials that causes them to change their shape or dimensions during the process of magnetization. If the first structure or the second structure exhibits magnetostriction, application of an external magnetic field will cause the first structure or the second structure to change its shape or dimension. This may lead to a magnetic response that may be detected. The information stored by the electromagnetic information marker may be represented by the response of the first structure or the second structure.

The first structure may comprise first sub-structures. The second structure may comprise second sub-structures. Each first sub-structure may together with the corresponding second sub-structure form a sub-marker configured to be read out by magnetic interaction with the sub-marker.

Each of the sub-markers may have a magnetic resonance frequency different from the magnetic resonance frequencies of the remaining sub-makers.

The aerosol generating article may comprise segments arranged along a longitudinal direction of the rod-shaped aerosol generating article. The aerosol generating article may comprise a first sheet wrapped around at least one of the segments. The aerosol generating article may comprise a second sheet wrapped around at least one of the segments and at least partially overlapping the first sheet. The first structure may be provided on the first sheet. The second structure may be provided on the second sheet.

At least a part of the information stored on the electromagnetic information marker may be re-writable. At least a part of the information stored on the electromagnetic information marker may be rewritable by magnetic interaction with the electromagnetic information marker.

According to another aspect of the present invention, there is provided an aerosol generating system. The aerosol generating system comprises a rod-shaped aerosol generating article and an electronic holder. The electronic holder is configured to receive the aerosol generating article to enable generation of aerosol. The aerosol generating article comprises an electromagnetic information marker. The electronic holder comprises a data reader configured to read out data from the electromagnetic information marker.

The electromagnetic information marker allows storing information directly on the aerosol generating article. Integrating the data reader with the electronic holder removes the need for a separate device for reading out data from the electromagnetic information marker. Data from the electromagnetic information marker may be made available to the electronic holder via the data reader. Data from the electromagnetic information marker may be processed by the electronic holder. Operation of the electronic holder may be controlled based on data from the electromagnetic information marker.

The data reader may be configured to read out data from the electromagnetic information marker when the aerosol generating article is at least partially received in the electronic holder. When reading out data, the aerosol generating article may be received in the electronic holder in the same way or substantially the same way as required when generating aerosol.

The electronic holder may comprise an input device configured to receive user input and configured to trigger reading out the data from the electromagnetic information marker by the data reader in response to the user input. The input device may comprise a button or a switch, for example.

The data reader may be configured to read out the data from the electromagnetic information marker upon insertion of the aerosol generating article into the electronic holder. The electronic holder may comprise a sensor detecting insertion of the aerosol generating article into the electronic holder and triggering the data reader to read out the data from the electronic information marker upon insertion of the aerosol generating article into the electronic holder.

The data reader may comprise a coil configured to generate an alternating magnetic field for reading out the data from the electromagnetic information marker.

The coil may also be configured to heat the aerosol generating article to enable generation of aerosol. If the same coil is used for heating the aerosol generating article and for reading out the data from the electromagnetic information marker, costs can be reduced.

The data reader may be configured to carry out a frequency sweep with an alternating magnetic field.

The data reader may be configured to detect a response of the electromagnetic information marker to an alternating magnetic field.

According to another aspect of the present invention, there is provided a use of a sheet for combining at least two segments of a rod-shaped aerosol generating article and as a substrate for a metallic structure of an electromagnetic information marker storing information about the aerosol generating article.

The metallic structure may be directly formed on the sheet.

The metallic structure may be, for example, printed onto the sheet, or evaporated onto the sheet, or laminated onto the sheet.

An additional sheet may be wrapped around at least one of the segments. The additional sheet may be used as a substrate for an additional metallic structure of the electromagnetic information marker.

Below, there is provided a non-exhaustive list of non-limiting examples regarding the invention. Any one or more of the features of these examples may be combined with any one or more features of another example, embodiment, or aspect described herein.

Example A1: Method for manufacturing a rod-shaped aerosol generating article, comprising:
- arranging segments in a row along a longitudinal direction;
- wrapping a first sheet around at least one of the segments; and
- wrapping a second sheet around at least one of the segments so as to at least partially overlap the first sheet,
- wherein upon wrapping the second sheet, an electromagnetic information marker is created, the electromagnetic information marker comprising a first structure provided on the first sheet and a second structure provided on the second sheet.

Example A2: Method according to Example A1, wherein upon wrapping the second sheet, the second structure is positioned to at least partially overlap the first structure.

Example A3: Method according to Example A1 or A2, wherein at least one of wrapping the first sheet and wrapping the second sheet connects two or more of the segments with each other.

Example A4: Method according to any one of Examples A1 to A3, wherein wrapping the second sheet is carried out after wrapping the first sheet.

Example A5: Method according to any one of Examples A1 to A4, wherein the first structure or the second structure comprises a first metallic material and the other one of the first structure and the second structure comprises a second metallic material, the first metallic material having a higher magnetic coercivity than the second metallic material.

Example A6: Method according to any one of Examples A1 to A5, further comprising reading out the electromagnetic information marker.

Example A7: Method according to Example A6, wherein reading out the electromagnetic information marker comprises exposing the electromagnetic information marker to an alternating magnetic field.

Example A8: Method according to Example A7, wherein exposing the electromagnetic information marker to the alternating magnetic field comprises carrying out a frequency sweep with the alternating magnetic field.

Example A9: Method according to Example A7 or A8, wherein reading out the electromagnetic information marker comprises detecting a response of the electromagnetic information marker to the alternating magnetic field.

Example A10: Method according to Example A9, wherein detecting the response of the electromagnetic information marker to the alternating magnetic field comprises determining presence or absence of a response of the electromagnetic information marker to the alternating magnetic field.

Example A11: Method according to Example A9 or Example A10, wherein detecting the response of the electromagnetic information marker to the alternating magnetic field comprises determining at least one frequency of the response of the electromagnetic information marker to the alternating magnetic field.

Example A12: Method according to any one of Examples A1 to A11, wherein the first structure comprises first sub-structures and the second structure comprises second sub-structures, wherein each first sub-structure forms together with a corresponding second sub-structure a sub-marker configured to be read out by magnetic interaction with the sub-marker.

Example A13: Method according to any one of Examples A1 to A12, further comprising writing information on the electromagnetic information marker after wrapping the second sheet.

Example A14: Method according to Example A13, wherein writing the information on the electromagnetic information marker comprises subjecting the information marker to a DC magnetic field.

Example A15: Method according to any one of Examples A1 to A14, further comprising printing the first structure onto the first sheet, or evaporating the first structure onto the first sheet, or laminating the first structure onto the first sheet.

Example A16: Method according to any one of Examples A1 to A15, further comprising printing the second structure onto the second sheet, or evaporating the second structure onto the second sheet, or laminating the second structure onto the second sheet.

Example A17: Method according to any one of Examples A1 to A16, wherein the electromagnetic information marker is configured to be read out by exposing the electromagnetic information marker to an alternating magnetic field.

Example A18: Method for producing a plurality of rod-shaped aerosol generating articles, comprising carrying out the method according to any one of Examples A1 to A17 multiple times, wherein a positioning of the second structure relative to the first structure is different for at least some of the produced aerosol generating articles.

Example B19: Rod-shaped aerosol generating article, comprising an electromagnetic information marker, wherein the electromagnetic information marker stores information having an information content exceeding one bit.

Example B20: Aerosol generating article according to Example B19, wherein the electromagnetic information marker stores information on one or more of a manufacturing location of the aerosol generating article, a manufacturing date of the aerosol generating article, a manufacturing time of the aerosol generating article, a type of the aerosol generating article, and verification information.

Example B21: Aerosol generating article according to Example B19 or B20, wherein the electromagnetic information marker comprises a first structure and a second structure at least partially overlapping the first structure.

Example B22: Aerosol generating article according to Example B21, wherein the first structure or the second structure comprises a first metallic material and the other one of the first structure and the second structure comprises a second metallic material, the first metallic material having a higher magnetic coercivity than the second metallic material.

Example B23: Aerosol generating article according to Example B21 or B22, wherein the first structure or the second structure exhibits magnetostriction.

Example B24: Aerosol generating article according to any one of Examples B21 to B23, wherein the first structure comprises first sub-structures and the second structure comprises second sub-structures, wherein each first sub-structure forms together with a corresponding second sub-structure a sub-marker configured to be read out by magnetic interaction with the sub-marker.

Example B25: Aerosol generating article according to Example B24, wherein each of the sub-markers has a magnetic resonance frequency different from the magnetic resonance frequencies of the remaining sub-markers.

Example B26: Aerosol generating article according to any one of Examples B21 to B25, wherein the aerosol generating article comprises segments arranged along a longitudinal direction of the rod-shaped aerosol generating article, a first sheet wrapped around at least one of the segments, and a second sheet wrapped around at least one of the segments and at least partially overlapping the first sheet, wherein the first structure is provided on the first sheet and the second structure is provided on the second sheet.

Example B27: Aerosol generating article according to any one of Examples B19 to B26, wherein at least a part of the information stored on the electromagnetic information marker is rewriteable.

Example C28: Aerosol generating system, comprising:

- a rod-shaped aerosol generating article, in particular according to any one of Examples B19 to B27; and
- an electronic holder, configured to receive the aerosol generating article to enable generation of aerosol,
- wherein the aerosol generating article comprises an electromagnetic information marker, and
- wherein the electronic holder comprises a data reader configured to read out data from the electromagnetic information marker.

Example C29: Aerosol generating system according to Example C28, wherein the data reader is configured to read out data from the electromagnetic information marker, when the disposable aerosol generating article is at least partially received in the electronic holder.

Example C30: Aerosol generating system according to Example C28 or C29, wherein the data reader is configured to read out data from the electromagnetic information marker upon insertion of the disposable aerosol generating article into the electronic holder.

Example C31: Aerosol generating system according to any one of Examples C28 to C30, wherein the data reader comprises a coil configured to generate an alternating magnetic field for reading out the data from the electromagnetic information marker.

Example C32: Aerosol generating system according to Example C31, wherein the coil is also configured to heat the aerosol generating article to enable generation of aerosol.

Example C33: Aerosol generating system according to any one of Examples C28 to C32, wherein the data reader is configured to carry out a frequency sweep with an alternating magnetic field.

Example C34: Aerosol generating system according to any one of Examples C28 to C33, wherein the data reader is configured to detect a response of the electromagnetic information marker to an alternating magnetic field.

Example D35: Use of a sheet for combining at least two segments of a rod-shaped aerosol generating article and as a substrate for a metallic structure of an electromagnetic information marker storing information about the aerosol generating article.

Example D36: Use according to Example D35, wherein the metallic structure is directly formed on the sheet.

Example D37: Use according to Example D35 or D36, wherein the metallic structure is printed onto the sheet, or evaporated onto the sheet, or laminated onto the sheet.

Example D38: Use according to any one of Examples D35 to D37, wherein an additional sheet is wrapped around at least one of the segments and is used as a substrate for an additional metallic structure of the electromagnetic information marker.

Examples regarding the invention will now be further described with reference to the figures, in which.

Figure 1:
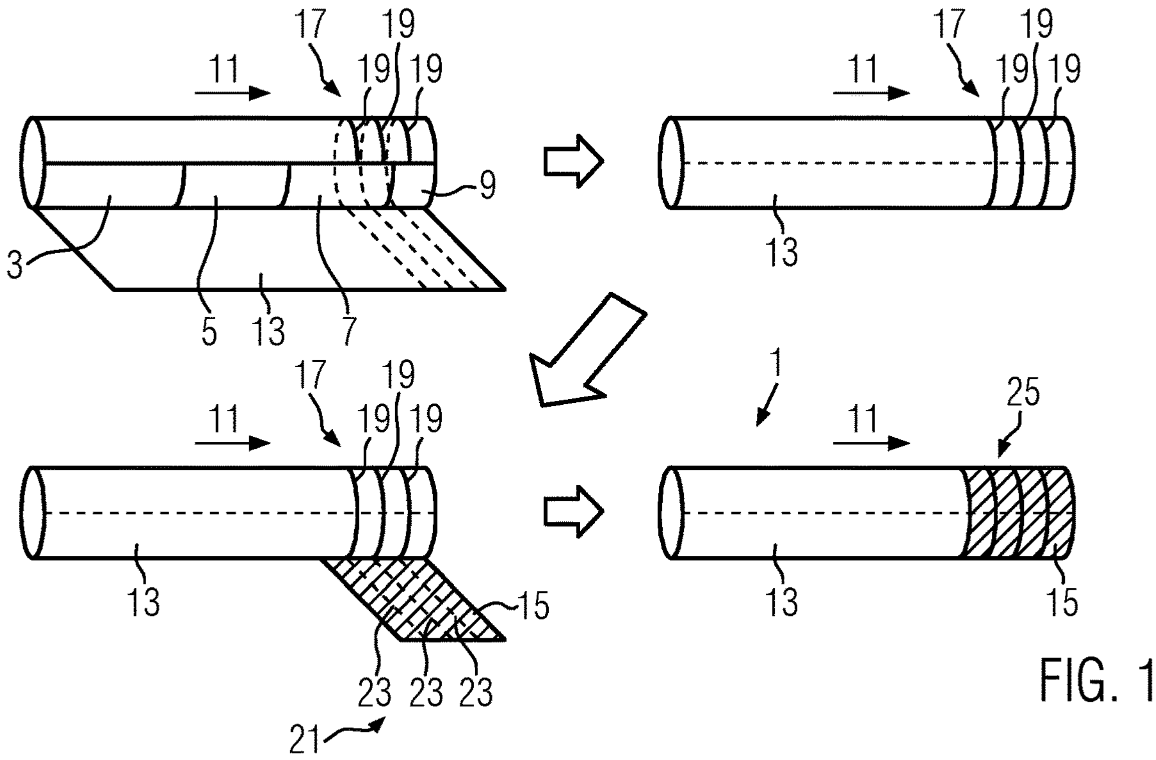
FIG. 1 shows a schematic representation of a manufacturing process of a rod-shaped aerosol generating article according to an embodiment.

FIG. 1 shows a schematic representation of a method for manufacturing a rod-shaped aerosol generating article 1 according to an embodiment. The aerosol generating article 1 comprises multiple segments 3, 5, 7, 9. In the illustrated embodiment, the aerosol generating article 1 comprises four segments 3, 5, 7, 9. However, a different number of segments is possible. The segments 3, 5, 7, 9 may be rod-shaped. The illustrated segments comprise a mouth piece segment 3 comprising a mouth piece for an aerosol generating article, a diffuser segment 5 comprising a diffuser, a tobacco material segment 7 comprising a tobacco material and, in some embodiments, a heat source for an aerosol generating article, and a cap segment 9 comprising a cap for an aerosol generating article. The segments 3, 5, 7, 9 are arranged in a row along a longitudinal direction 11.

As shown in the first section of FIG. 1, a first sheet 13 is wrapped around the segments 3, 5, 7, 9 to combine the segments 3, 5, 7, 9. The first sheet 13 may comprise a foil. The first sheet 13 may comprise paper. The first sheet 13 may be metallized or laminated.

After the first sheet 13 has been wrapped around the segments 3, 5, 7, 9, a second sheet 15 is wrapped around the heat source segment 7 and the cap segment 9. The second sheet 15 is wrapped over the first sheet 13. The second sheet 15 may comprise a foil. The second sheet 15 may comprise paper. The second sheet 15 may be metallized or laminated.

A first structure 17 is provided on the first sheet 13. In the illustrated embodiment, the first structure 17 comprises three sub-structures 19. The three sub-structures 19 are shaped as parallel lines or stripes that are oriented so as to form parallel circles around a center axis of the segments 3, 5, 7, 9 after wrapping of the first sheet 13. The first structure 17 may be formed on the first sheet 13 before wrapping the first sheet 13 around the segments 3, 5, 7, 9. The first structure 17 may be printed, evaporated, or laminated onto the first sheet 13. The first structure 17 is integral with the first sheet 13. In the illustrated embodiment, the first structure 17 is provided on an outer side of the first sheet 13, which is the side of the first sheet 13 facing away from the segments 3, 5, 7, 9 after the first sheet 13 has been wrapped around the segments 3, 5, 7, 9. However, the first structure 17 or one or more first sub-structures 19 might alternatively be provided on an inner side of the first sheet 13 facing the segments 3, 5, 7, 9.

A second structure 21 is provided on the second sheet 15. In the illustrated embodiment, the second structure 21 comprises three second sub-structures 23. The second structure 21 may be formed on the second sheet 15 before wrapping the second sheet 15 around the segments 7, 9. The second structure 21 may be printed, evaporated, or laminated onto the second sheet 15. The second structure 21 is integral with the second sheet 15. In the illustrated embodiment, the second structure 21 is provided on an outer side of the second sheet 15, which is the side of the second sheet 15 facing away from the segments 7, 9 after the second sheet 15 has been wrapped around the segments 7, 9. However, the second structure 21 or one or more second sub-structures 23 might alternatively be provided on an inner side of the second sheet 15 facing the segments 7, 9.

The second structure 21 is positioned on the second sheet 15 such that after wrapping the second sheet 15 around the segments 7, 9, the second structure 21 overlaps the first structure 17. In particular, each second sub-structure 23 overlaps with a corresponding first sub-structure 19. In the illustrated embodiment, the shapes and sizes of the second sub-structures 23 correspond to the shapes and sizes of the first sub-structures 19. It would, however, also be possible to have different shapes for the first sub-structures 19 and the second sub-structures 23. The first structure 17 and the second structure 21 may touch after wrapping the first and second sheets 13, 15. Alternatively, the first structure 17 and the second structure 21 may not touch after wrapping the first and second sheets 13, 15. The first structure 17 and the second structure 21 may be spaced from each other.

The first structure 17 or the second structure 21 may comprise or be formed of a first metallic material. The other one of the first structure 17 and the second structure 21 may comprise or be formed of a second metallic material. The first metallic material may comprise metallic components. The first metallic material may comprise a metallic ink or a metallic paste. The second metallic material may comprise metallic components. The second metallic material may comprise a metallic ink or a metallic paste. The first metallic material or the second metallic material or both may comprise a metal based alloy. The metal based alloy may comprise manganese. The metal based alloy may comprise manganese at 7 to 20 weight percent, or at 9 to 18 weight percent, or at 11 to 15 weight percent. The metal based alloy may comprise at least one ferromagnetic material. The metal based alloy may comprise at least one ferromagnetic material at less than 10 weight percent, or at less than 8 weight percent. The metal based alloy may comprise iron (Fe). The metal based alloy may comprise or be based on one or more of cobalt (Co), chromium (Cr), nickel (Ni), titanium (Ti), and aluminum (Al).

Figure 2:
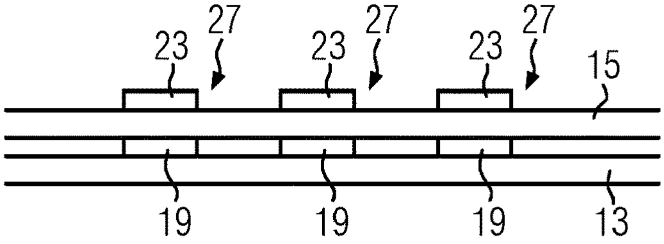
FIG. 2 shows a schematic sectional view through the first sheet and the second sheet of the aerosol generating article according to the embodiment of FIG. 1 at the position of the electromagnetic information marker, wherein the sectional plane is parallel to the longitudinal direction of the aerosol generating article.

FIG. 2 shows a schematic partial sectional view through the first sheet 13 and the second sheet 15 after the first sheet 13 and the second sheet 15 have been wrapped around the segments 3, 5, 7, 9 with the sectional plane being parallel to the longitudinal direction. As shown in FIG. 2, each of the second sub-structures 23 provided on the second sheet 15 overlaps with a corresponding one of the first sub-structures 19 provided on the first sheet 13. The first structure 17 and the second structure 21 together form an information marker 25. In the embodiment of FIGS. 1 and 2, the information marker 25 comprises three sub-markers 27. Each sub-marker 27 comprises a first sub-structure 19 and the corresponding second sub-structure 23. The first sub-structure 19 and the corresponding second sub-structure 23 of a particular sub-marker 27 overlap with each other.

Figure 3:
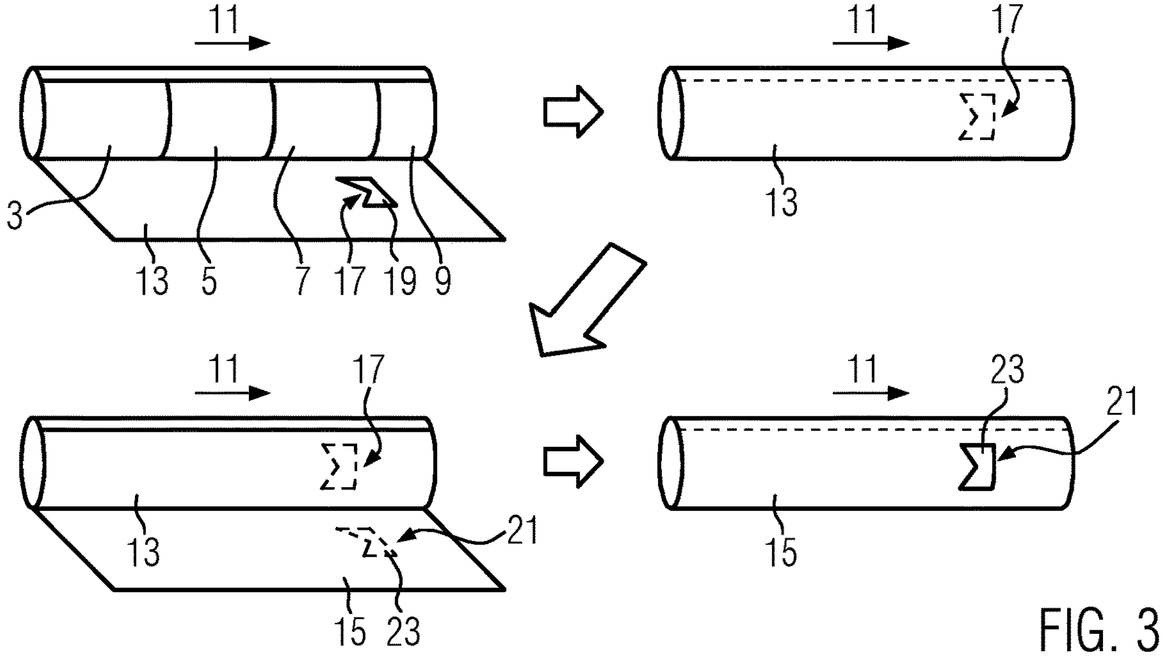
FIG. 3 shows a schematic representation of a manufacturing process of a rod-shaped aerosol generating article according to another embodiment.

FIG. 3 illustrated manufacturing of a rod-shaped aerosol generating article 1 according to another embodiment. Only selected differences, with respect to the embodiment of FIGS. 1 and 2 will be described. In the embodiment of FIG. 3, the electromagnetic information marker 25 comprises only one sub-marker 27. The first structure 17 provided on the first sheet 13 comprises only one first sub-structure 19. The second structure 21 provided on the second sheet 15 comprises only one second sub-structure 23. When the first sheet 13 and the second sheet 15 have been wrapped, the second structure 21 is positioned to overlap the first structure 17. The first structure 17 and the second structure 21 are identically sized and shaped in the embodiment of FIG. 3. However, it will be conceivable that the first structure 17 and the second structure 21 might also differ in size or shape. In the embodiment of FIG. 3, the first structure 17 is provided on the side of the first sheet 13 that faces inward towards the segments 3, 5, 7, 9, after the first sheet 13 has been wrapped around the segments 3, 5, 7, 9. In the embodiment of FIG. 3, the second structure 21 is provided on a side of the second sheet 15 that faces outward away from the segments 3, 5, 7, 9 after once the second sheet 15 has been wrapped around the segments 3, 5, 7, 9. In the embodiment of FIG. 2, the second sheet 15 is wrapped around all four segments 3, 5, 7, 9.

Figure 4:
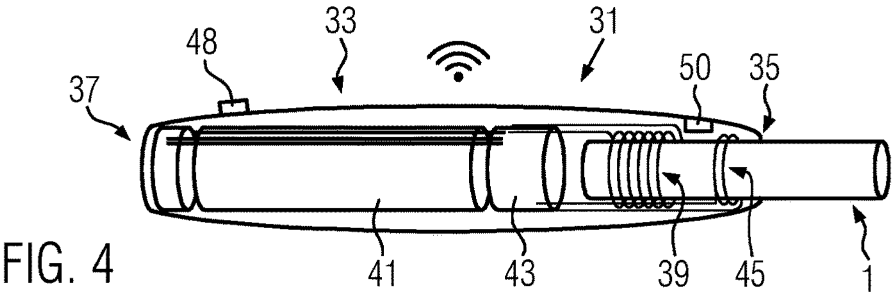
FIG. 4 shows schematic representation of an aerosol generating system according to an embodiment in which the electronic holder comprises separate coils for heating the aerosol generating article and for reading out data from the electromagnetic information marker.

FIG. 4 illustrates an aerosol generating system 31 comprising an aerosol generating article 1 and an electronic holder 33. The aerosol generating article 1 is shown in an inserted position inserted into the electronic holder 33. The aerosol generating article 1 may be the aerosol generating article 1 shown in FIG. 1 or the aerosol generating article 1 shown in FIG. 3. The electronic holder 33 has a reception opening 35 for receiving the aerosol generating article 1. The holder 33 further comprises an aerosol opening 37 for discharging aerosol generated by heating the aerosol generating article 1. Further, the electronic holder 33 comprises a heater 39 for heating the aerosol generating article 1 to generate aerosol. In the illustrated embodiment, the heater 39 is an electric heater and comprises a heating coil. A filter element 41 for filtering the aerosol is provided between the reception opening 35 and the aerosol opening 37. The electronic holder 33 comprises a control unit 43 controlling operation of the heater 39. The electronic holder 33 further comprises a data reader 45 configured to read out data from the electromagnetic information marker 25 of the aerosol generating article 1. The data reader 45 comprises a coil that is configured to generate an alternating magnetic field. The data reader 45 may be controlled by the control unit 43.

According to an embodiment, the first structure 17 has a higher magnetic coercivity than the second structure 21 and is referred to as switching structure, and the second structure 21 having the lower magnetic coercivity is referred to as switched structure. According to another embodiment, the second structure 21 has a higher magnetic coercivity than the first structure 17 and is referred to as switching structure, and the first structure 17 having the lower magnetic coercivity is referred to as switched structure.

Each sub-structure 19, 23 of the switched structure 17, 21 may be switched between an activated state and a deactivated state. In the activated state, the switched sub-structure 19, 23 of a particular sub-marker 27 emits a detectable electromagnetic response, if subjected to an alternating magnetic field generated by the data reader 45 at a resonance frequency of the sub-marker 27. The resonance frequencies of the sub-markers 27 may be different from each other to enable reading out the sub-markers 27 individually. The response by the sub-marker 27 to the alternating magnetic field generated the data reader 45 may be detected by the data reader 45. The control unit 43 may control the data reader 45 to determine for each of the sub-markers 27 whether the sub-marker 27 is in the activated state (responds to the alternating magnetic field) or in the deactivated state (does not respond to the alternating magnetic field). Based on this approach, the electromagnetic information marker 25 may store information corresponding to information content of as many bits as there are sub-markers 27.

Additional information may be coded in the resonance frequencies of the individual sub-markers 27. The sub-markers 27 may be specifically designed to respond to an alternating magnetic field at a specific resonance frequency. The resonance frequency of a particular sub-marker 27 may be determined by the data reader 45 by carrying out a frequency sweep over a range of frequencies and detecting at which frequency a response from the sub-marker 27 is received. The resonance frequency of a sub-marker 27 may depend on the exact positioning of the first sheet 13 with respect to the second sheet 15 and on the specific shape and material composition of the first structure 17 and the second structure 21.

The switched structure 17, 21 may exhibit magnetostriction. In this case, if the switched structure 17, 21 is subjected to an alternating magnetic field at the specific resonance frequency of the switched structure 17, 21 by the data reader 45, the switched structure 17, 21 will change its shape or size. In particular, the switched structure 17, 21 may change its shape or size periodically at a rate corresponding to the resonance frequency of the switched structure 17, 21. The change in size and shape of the switched structure 17, 21 leads to emission of an electromagnetic response signal. Emission of the electromagnetic response signal may continue for a short duration after the alternating magnetic field by the data reader 45 is no longer generated due to continued changing of size and shape of the switched structure 17, 21.

The electromagnetic information marker 25 may store information about the aerosol generating article 1. For example, the electromagnetic information marker 25 may store information about one or more of a manufacturing location of the aerosol generating article 1, a manufacturing date of the aerosol generating article 1, a manufacturing time of the aerosol generating article 1, a type of the aerosol generating article 1, and verification information. The information on the electromagnetic information marker 25 may be used by the control unit 43 of the electronic holder 33 to improve operation of the electronic holder 33. For example, the control unit 43 may control heating of the aerosol generating article 1 based on a type of the aerosol generating article 1 derived from the data stored on the electromagnetic information marker 25. The control unit 43 may control the electronic holder 33 to commence heating the aerosol generating article 1 only if verification information on the electronic information marker 25 is determined to be valid. The control unit 43 may commence heating of the aerosol generating article 1 only if a date, such as a manufacturing date or a best before date, stored on the information marker 25 is within a predetermined range.

The electronic holder 33 may be configured for communication with an external device or an external network. The electronic holder 33 may transmit information obtained from the electromagnetic information marker 25 to the external device or to the external network.

The electronic holder 33 may comprise an input device 48 configured to receive user input and configured to trigger reading out the data from the electromagnetic information marker 25 by the data reader 45 in response to the user input. The input device may comprise a button or a switch, for example.

Alternatively or in addition, the data reader 45 may be configured to read out the data from the electromagnetic information marker 25 upon insertion of the aerosol generating article 1 into the electronic holder 33. The electronic holder 33 may comprise a sensor 50 detecting insertion of the aerosol generating article 1 into the electronic holder 33 and triggering the data reader 45 to read out the data from the electronic information marker 25 upon insertion of the aerosol generating article 1 into the electronic holder 33.

Figure 5:
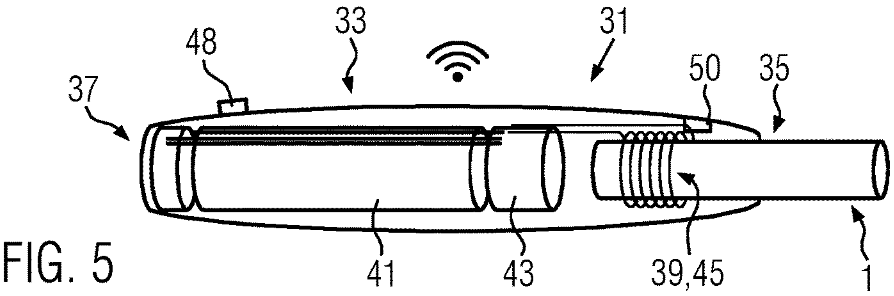
FIG. 5 shows a schematic representation of an aerosol generating system according to an embodiment with an electronic holder having a common coil for heating the aerosol generating article and for reading out data from electronic information marker.

FIG. 5 illustrates an alternative electronic holder 33. The electronic holder 33 shown in FIG. 5 is largely the same as the electronic holder 33 shown in FIG. 4. However, in the embodiment of FIG. 5, the coil of the heater 39 is controlled by the control unit 43 to also fulfill the function of the data reader 45 so that no separate coil attributed to the data reader 45 is required.

By changing the states of individual sub-markers 27 from activated to deactivated or from deactivated to activated, data may be newly written onto the electromagnetic information marker 25 or data on the electronic information marker 25 may be rewritten. The state of a sub-marker 27 can be changed by subjecting the sub-structure 19, 23 of the switching structure 17, 21 corresponding to the respective sub-marker 27 to a DC magnetic field. A field strength of the DC magnetic field may be high enough to permanently change the magnetization of the sub-structure 19, 23. In the deactivated state of a sub-marker 27, the switching sub-structure 19, 23 of the sub-marker 27 may be magnetized so as to prevent the switched sub-structure 19, 23 of the sub-marker 27 from following the alternating magnetic field from the data reader 45 and thereby from emitting a response to the alternating magnetic field. Alternatively, bringing the switching sub-structure 19, 13 of a sub-marker 27 in the deactivated state may change a resonance frequency of the switched sub-structure 19, 13 of the sub-marker 27, which may be detected by the data reader 45.

Figure 6:
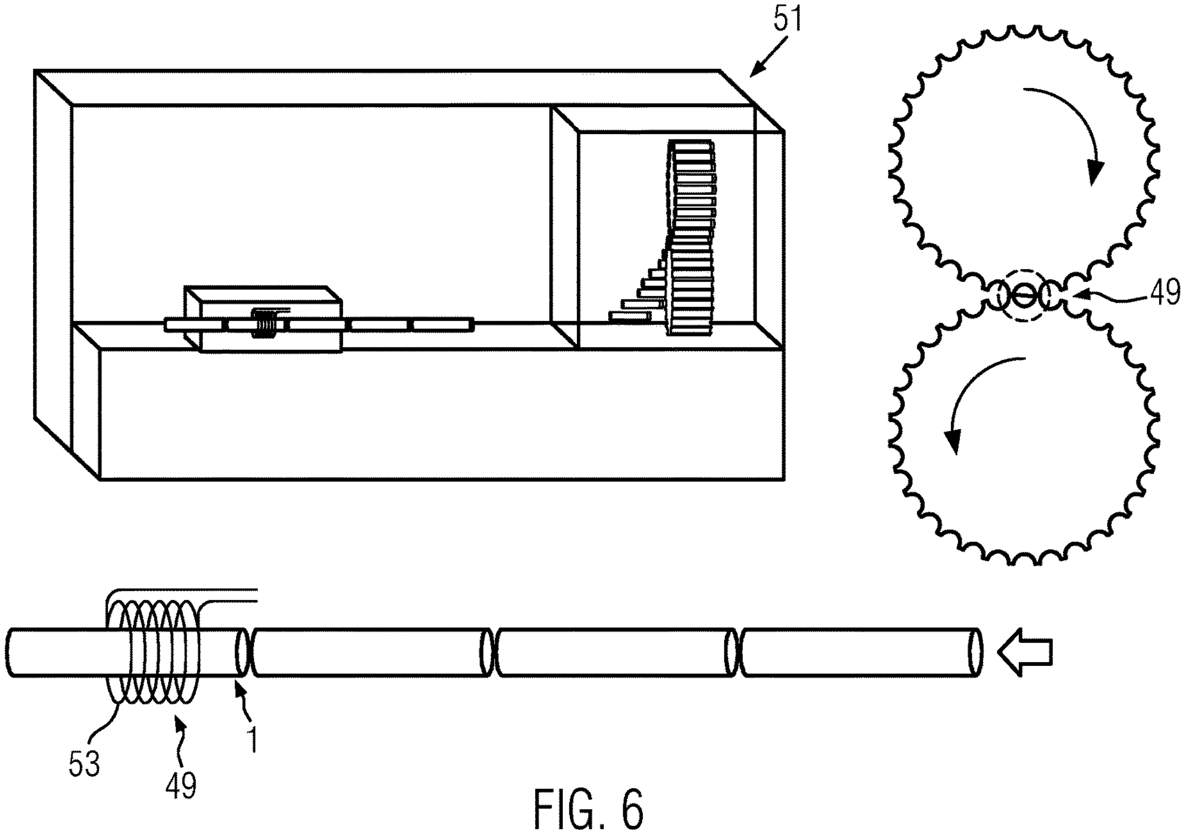
FIG. 6 shows a schematic representation of a manufacturing equipment for manufacturing an aerosol generating article according to an embodiment.

According to embodiments, information is written onto the electromagnetic information marker 25 during a manufacturing process of the aerosol generating article 1. For example, as illustrated in FIG. 6, one or more writing devices 49 may be provided in a manufacturing apparatus 51 for carrying out one or more manufacturing steps of the aerosol generating article 1. In the embodiment shown in FIG. 6, a first writing device 49 comprises a coil 53 surrounding a linear path along which aerosol generating articles 1 or precursor products of aerosol generating articles 1 are conveyed. The coil 53 may generate a DC magnetic field. The aerosol generating articles 1 or the precursor products of aerosol generating articles 1 passing through the coil 53 are subjected to the DC magnetic field, whereby information may be written onto the electromagnetic information marker 25.

FIG. 6 also illustrates a second writing device 49 that is integrated in a drum device for rotatingly conveying aerosol generating articles 1 or precursor products of aerosol generating articles 1. The drum device comprises two rotating drums for conveying aerosol generating articles 1 or precursor products of aerosol generating articles 1. A first one of the rotating drums is configured to give the aerosol generating articles 1 or the precursor products of the aerosol generating articles 1 over to the second drum in a transfer region. In the transfer region, coils of the first drum and coils of the second drum match to enable writing onto the electromagnetic information marker 25.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is in particular understood as A±10% of A.

The invention claimed is:

1. A rod-shaped aerosol-generating article, comprising:
- segments arranged along a longitudinal direction of the rod-shaped aerosol generating article;
- a first sheet wrapped around at least one of the segments;
- a second sheet distinct from the first sheet, wrapped around at least one of the segments separately from the first sheet, the second sheet being wrapped over the first sheet and at least partially overlapping the first sheet; and
- an electromagnetic information marker,
- wherein the electromagnetic information marker stores information having an information content exceeding one bit,
- wherein the electromagnetic information marker comprises a first structure and a second structure at least partially overlapping the first structure,
- wherein the first structure is provided on the first sheet and the second structure is provided on the second sheet, and
- wherein the first structure or the second structure comprises a first metallic material and the other one of the first structure and the second structure comprises a second metallic material, the first metallic material having a higher magnetic coercivity than the second metallic material.

2. The rod-shaped aerosol-generating article according to claim 1, wherein the electromagnetic information marker stores information on one or more of a manufacturing location of the aerosol-generating article, a manufacturing date of the aerosol-generating article, a manufacturing time of the aerosol-generating article, a type of the aerosol-generating article, and verification information.

3. The rod-shaped aerosol-generating article according to claim 1, wherein the first structure or the second structure exhibits magnetostriction.

4. The rod-shaped aerosol-generating article according to claim 1,
- wherein the first structure further comprises first sub-structures and the second structure further comprises second sub-structures, and
- wherein each first sub-structure forms together with a corresponding second sub-structure a sub-marker configured to be read out by magnetic interaction with the sub-marker.

5. The rod-shaped aerosol-generating article according to claim 4, wherein each of the sub-markers has a magnetic resonance frequency different from magnetic resonance frequencies of the remaining sub-markers.

6. The rod-shaped aerosol-generating article according to claim 1, wherein a magnetic coercivity of the second metallic material lies in a range from 10 Oersted to 90 Oersted.

7. The rod-shaped aerosol-generating article according to claim 1, wherein the electromagnetic information marker is configured to be read out by exposing the electromagnetic information marker to an alternating magnetic field.

8. The rod-shaped aerosol-generating article according to claim 1, wherein at least a part of information stored on the electromagnetic information marker is rewritable.

9. The rod-shaped aerosol-generating article according to claim 1, wherein the first structure and the second structure are spaced from each other.

10. The rod-shaped aerosol-generating article according to claim 1, wherein the one of the first structure and the second structure having a lower magnetic coercivity is a switched structure, and the switched structure exhibits magnetostriction.

11. The rod-shaped aerosol-generating article according to claim 4, wherein the one of the first structure and the second structure having a lower magnetic coercivity is a switched structure, and each sub-structure of the switched structure is configured to be switched between an activated state and a deactivated state.

12. An aerosol-generating system, comprising:
- a rod-shaped aerosol-generating article according to claim 1; and
- an electronic holder, configured to receive the rod-shaped aerosol-generating article to enable generation of aerosol,
- wherein the rod-shaped aerosol-generating article further comprises an electromagnetic information marker, and
- wherein the electronic holder comprises a data reader configured to read out data from the electromagnetic information marker.

13. A method for manufacturing the rod-shaped aerosol-generating article according to claim 1, the method comprising:
- arranging segments in a row along the longitudinal direction;
- wrapping the first sheet around at least one of the segments; and
- wrapping the second sheet around at least one of the segments so as to at least partially overlap the first sheet,
- wherein upon wrapping the second sheet, the electromagnetic information marker is created, the electromagnetic information marker comprising the first structure provided on the first sheet and the second structure provided on the second sheet.

14. The method according to claim 13, wherein upon wrapping the second sheet, the second structure is positioned to at least partially overlap the first structure.

15. The method according to claim 13, wherein the first structure comprises first sub-structures and the second structure comprises second sub-structures, and wherein each first sub-structure forms together with a corresponding second sub-structure a sub-marker configured to be read out by magnetic interaction with the sub-marker.

16. The method according to claim 13, further comprising writing information on the electromagnetic information marker after wrapping the second sheet.

17. The method according to claim 13, wherein the electromagnetic information marker is configured to be read out by exposing the electromagnetic information marker to an alternating magnetic field.

18. A method for producing a plurality of rod-shaped aerosol-generating articles, comprising carrying out the method according to claim 13 multiple times, wherein a positioning of the second structure relative to the first structure is different for at least some of the produced rod-shaped aerosol-generating articles.

* * * * *